United States Patent [19]

Ruby

[11] 4,086,804
[45] May 2, 1978

[54] PRECISION PNEUMATIC PRESSURE SUPPLY SYSTEM

[75] Inventor: Joseph H. Ruby, Glendale, Ariz.

[73] Assignee: Sperry Rand Corporation, New York, N.Y.

[21] Appl. No.: 735,249

[22] Filed: Oct. 26, 1976

[51] Int. Cl.² .............................................. G01L 27/00
[52] U.S. Cl. .................................... 73/4 R; 137/487.5
[58] Field of Search ........................ 73/4 R; 137/487.5

[56] References Cited

U.S. PATENT DOCUMENTS

| 3,060,718 | 10/1962 | Malkiel | 73/4 R |
| 3,263,482 | 8/1966 | Shank | 73/4 R |
| 3,794,070 | 2/1974 | Klem | 137/487.5 |

Primary Examiner—S. Clement Swisher
Attorney, Agent, or Firm—Howard P. Terry

[57] ABSTRACT

A dual closed loop, precision pneumatic pressure selection, control and display system for use in testing pneumatic apparatus provides precision digital high response analog control of a precision pneumatic valve for establishing, maintaining, and displaying selected reference pressures and rates of change thereof as a ratio between a regulated pressure and a vacuum, the resultant pressure being sensed by a precision pressure sensor of the vibrating diaphragm type. The first closed loop is a digital loop, the desired reference pressure or pressure rate being commanded in any desired pneumatic unit of measure as a binary coded decimal signal and converted to a common unit of measure. The output of the pressure sensor responsive to valve operation is converted to a binary coded decimal signal in said common units, these two signals being digitally compared and the difference between them being converted to an analog signal for adjusting the valve, thereby maintaining the selected pressure. The second loop is a high response, high resolution analog control loop system wherein the analog error signal of the first loop controls valve position, a further output of the pressure sensor being converted to an analog signal and compared with the analog error signal to adjust the valve so as to zero the analog error signal. Thus, the system employs duel control loops combining the high precision of a digital process closed loop. The system uses similar and separately selectable $P_S$ and $P_T$ outputs in terms of inches of mercury, millibars, feet, knots, feet per minute, knots per minute, etc., with channels which may be cross-coupled one to the other to yield $Q_C$ control without requiring a separate sensor.

16 Claims, 9 Drawing Figures

FIG. 2.
OVERALL SYSTEM

CONTROL PANEL

OVERALL SYSTEM

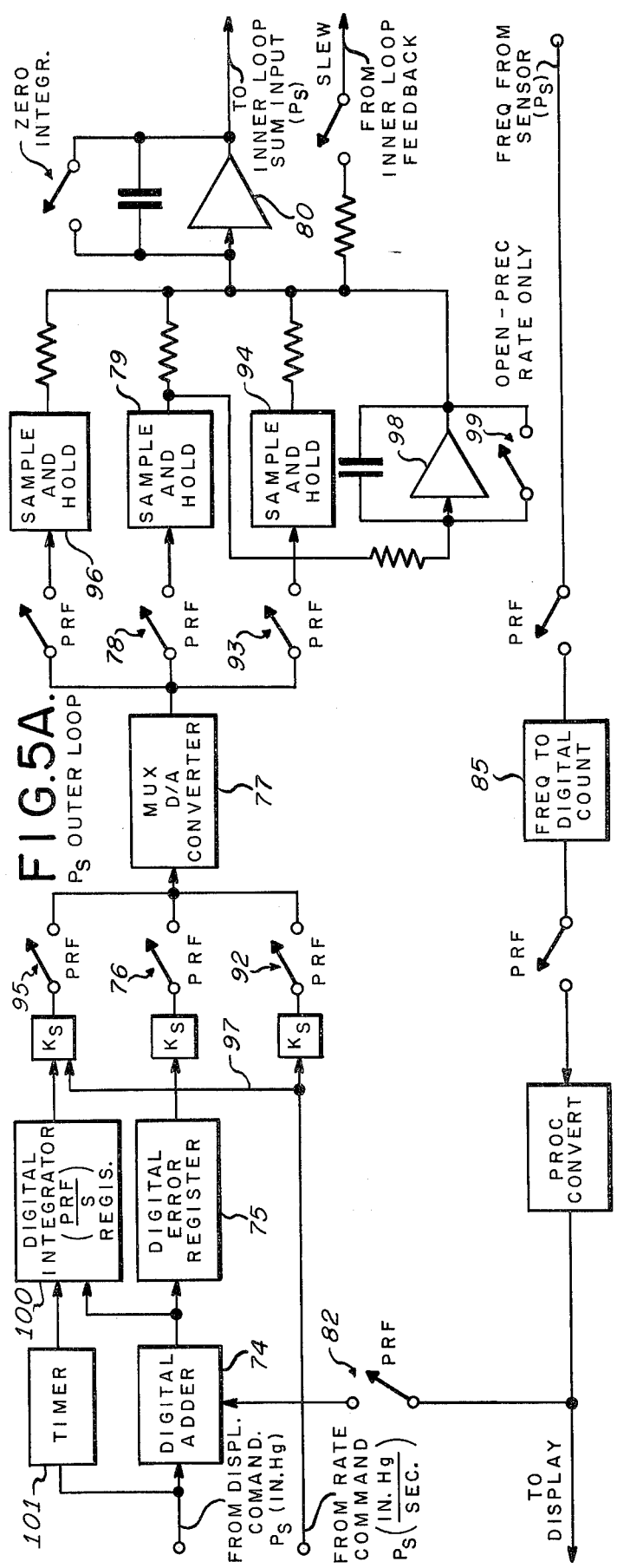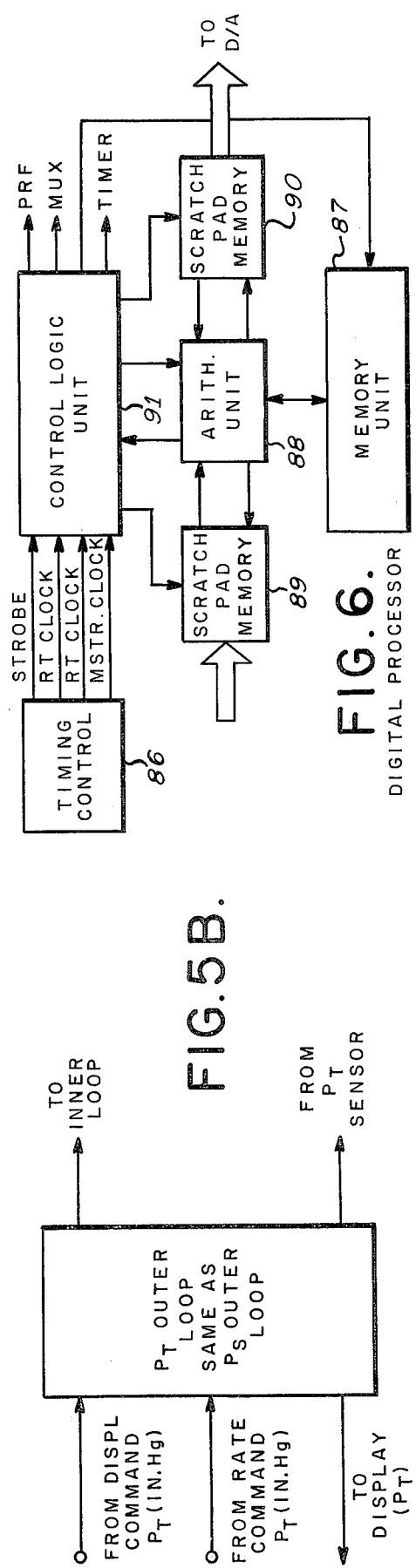

PRECISION PNEUMATIC PRESSURE SUPPLY SYSTEM

BACKGROUND OF THE INVENTION

1. Field of the Invention

The present invention relates generally to pneumatic test equipment and more particularly to apparatus for providing precision pressure reference sources especially applicable as test and maintenance apparatus particularly useful in the testing of aircraft pneumatic avionic equipment.

2. Description of the Prior Art

Pressure reference sources have been known and used as laboratory and factory test tools as well as for testing and maintaining pneumatic systems such as air data measurement and display systems for aircraft. In the past, many of these systems have relied on manometric devices involving analog servo systems subject to undesirable lag, amplifier drifts, and offsets and difficult to isolate completely from ambient temperature and pressure conditions. Being fragile and large in size, they are generally restricted to use as permanent fixtures in stationary locations.

There has also been employed in the past a pressure reference system, similar in some respects to the present system, in which an electrically-controlled valve is used to establish a desired reference pressure as a predetermined ratio between a predetermined high pressure and a vacuum. The reference pressure amplitude is detected by a pressure sensor, is converted into an electric signal, and is fed back for comparison with a signal representing the desired pressure, the difference controlling the servo valve to reduce the difference to zero. This single closed loop system is wholly analog and depends on phase comparison of the desired reference pressure signal and the sensor signal and is therefore subject to the drift, offset, and other errors normally associated with analog servo loops.

In a more recent system disclosed in U.S. Pat. No. 3,794,070 for a "Precision Reference Pressure Supply System", issued to Klem et al on Feb. 26, 1974 and also assigned to the present assignee, a closed-loop, precision variable pressure reference test system employs the same general type of single closed-loop precision valve and vibratory diaphragm pressure sensor arrangement. The arrangement of the Klem et al patent uses a single control loop system and is relatively precise and rapid in operation. However, in Klem et al, the commands and displays are in meaningless numbers, hence primarily useful only in automatic test equipment not involving selectable data in conventional units or dimensions. Also, the single loop system is not highly responsive and tends to overshoot the commanded pressure value and its response is sluggish. Further, the single loop system of Klem et al did not provide precision closed-loop pressure rate control nor did it provide $Q_C$ control. Finally, offsets in the Klem et al system required periodic adjustments to maintain equality between the commanded and displayed pressures.

SUMMARY OF THE INVENTION

The present invention overcomes the problems associated with the prior art systems discussed in the foregoing. It provides a rugged and extremely versatile, portable pressure reference system in which the controlling error signal for positioning the precision valve is derived both in analog and digital control loops for affording enhanced operational flexibility, speed, and precision. The system employs dual control loops, combining the accuracy of high precision digital control with the smooth, fast, and high resolution characteristics of an analog control, thereby providing smooth and accurate pressure rate measurement and control. Similar pitot static ($P_S$) and pitot dynamic ($P_T$) channels are provided, with the selection, control and maintenance of the selected pressure in whatever of the usual pressure units of measure the operator wishes to use. Further, by use of cross-coupling circuits between the two channels, $Q_C$ selection and control is provided without the actual presence of a $Q_C$ or pitot dynamic pressure sensor. All unit conversion of pressures and pressure rates and outer loop controls are accomplished digitally using sampled data signal transfer techniques, the latter enhancing the precision control of pressure rates.

BRIEF DESCRIPTION OF THE DRAWINGS

FIG. 1 is a front view of the control panel of the test system showing pneumatic connections to the unit under test, the command inputs and displays and command output displays, mode selectors, command enter control, and the like.

FIGS. 4, 5A, and 5B are block diagrams of the digital outer loops of each channel arranged to provide command and display of $P_S$ and $P_T$ pressures and pressure rates in inches of mercury.

FIG. 6 is a schematic block diagram of a conventional digital processor for performing conversion computations and sampled data signal transfer functions.

DESCRIPTION OF THE PREFERRED EMBODIMENTS

The invention provides a precise and stable apparatus for the rapid testing in the factory, on the flight line, or in the repair depot of precision pneumatic avionic equipment and the like, including aircraft airspeed and Mach indicators, altitude indicators, rate of climb indicators, and complete air data computers and the like. For this purpose, the invention provides accurately controlled sources of pneumatic pressure and pressure rates, operating a pressure selector and controller and maintaining precision pressure and pressure rate standards.

In testing such pneumatic avionics equipment, there is desired, on the one hand, a reference source of accurately known pneumatic pressures corresponding to those experienced by an aircraft in flight as derived from the aircraft pitot static and pitot dynamic sources. Thus, this reference should be able to supply static pressures $P_S$ corresponding to various selectable altitudes ranging, for example, from −1800 feet (below sea level) to over ninety thousand feet and precise static pressure rates corresponding to aircraft rates of climb or dive ranging from zero to forty or sixty-five thousand feet per minute. The "Static Pressure Channel ($P_S$) (ALT)" illustrated at the left of the control panel of FIG. 1 provides such static pressure and static pressure rate controls of displays.

For the complete test system, a reference source of pitot dynamic pressure is provided for the test of the air speed avionics apparatus and the airspeed portions of air data computers, for example. For this purpose, the invention provides the "Pitot Pressure Channel ($P_T$) ($Q_C$) (A/S)" illustrated at the right side of the control panel of FIG. 1. These two channels are essentially identical in structure and function, although certain signals generated in the static channel are injected into the pitot channel for providing a measure and control of $Q_C$, as will be discussed. The pitot pressure channel provides test capability in ranges of airspeed up to 1000 knots and of airspeed rates up to 750 knots per minute, for example. It will be recognized by those skilled in the art that suitable conventional power supplies (not shown), pneumatic regulator valves, shut off valves, and safety interlocks may cooperate with the elements of the system in a conventional manner.

Figure 1:
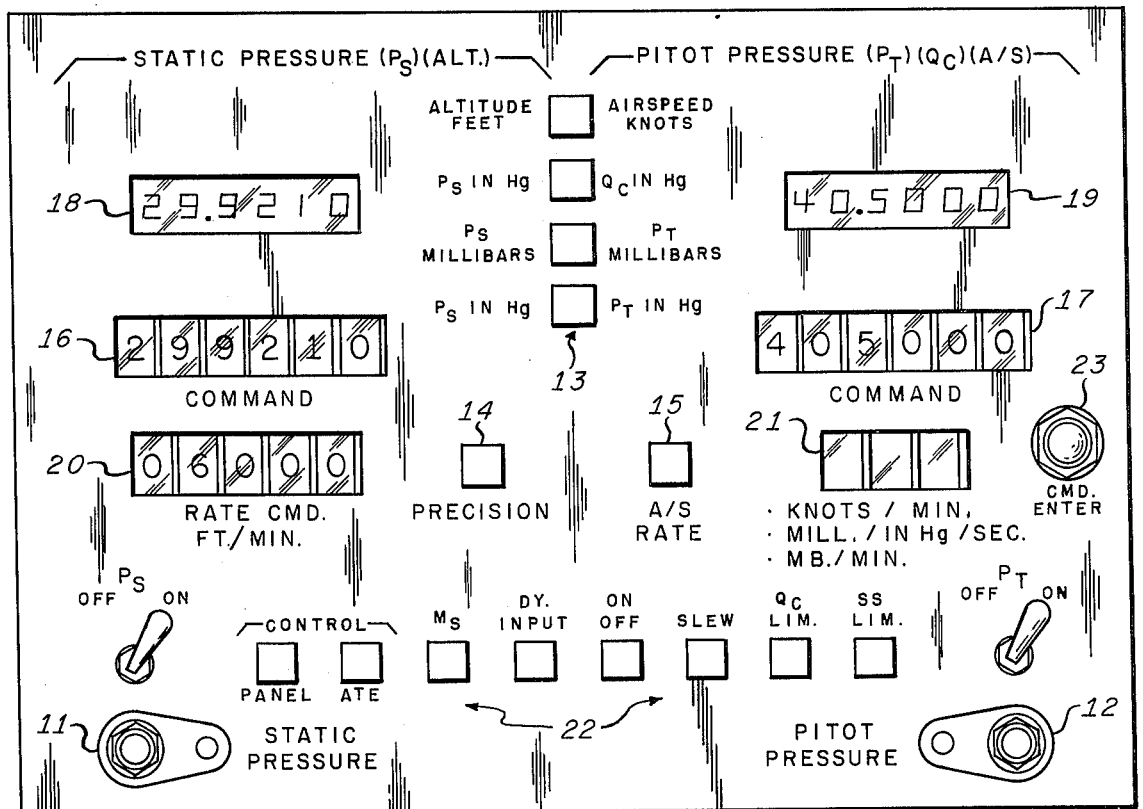

Referring now to FIG. 1, the control panel 10 provides static and pitot pressure output ports 11 and 12 adapted to receive suitable pneumatic lines from corresponding input ports of the unit or units under test (hereinafter sometimes referred to simply as UUT). In general, static pressure measurement and control may be provided in the units indicated adjacent the mode select buttons 13 at the top center of the panel; viz., altitude in feet, airspeed in knots, $P_S$ and $P_T$ in inches of mercury, $P_S$ and $P_T$ in millibars, and $P_S$ and $Q_C$ in inches of mercury. Each of the push buttons 13 is of the annunciator type, so that when pressed it illuminates so that the operator is always advised of the selected/pressure unit. Static ($P_S$) and pitot ($P_T$) pressures in the units selected by selector button 13 may be selected or commanded by the operator through conventional thumb wheel switch/indicators 16 and 17, respectively, and such commanded pressures, when achieved by the system, are displayed by means of conventional alphanumeric displays 18 and 19, respectively, such as, for example, seven-segment gas tube displays, also in the units selected by selector buttons 13. Similarly, normal $P_S$ and $P_T$ rates may be commanded by similar thumb wheel switch/indicators 20 and 21. The $P_S$ rates are always commanded in altitude rate in feet per minute, while the $P_T$ rates are commanded in knots per minute, milli-inches of mercury per second, or millibars per minute depending upon the pressure units selected by buttons 13. Additionally, precision rates are available by button selectors 14 and 15. In either case, the actual pressure displays 18 and 19 will change at the rate commanded.

Along the bottom of the panel 10 are other selector buttons/annunciators 22 for providing OFF-ON, Measure ($M_S$) mode, Control mode (panel and automatic test equipment), and other functions not necessarily specifically pertinent to the present discussion of the invention.

After the commanded data has been set on the thumb wheel select counters 16 and/or 17 and/or 20 and/or 21, the commanded data is entered into the system by pressing the command entry button 23. The system thereafter slaves to the command, supplies the commanded pressures to the unit under test, and displays this command on displays 18 and/or 19.

Figure 2:
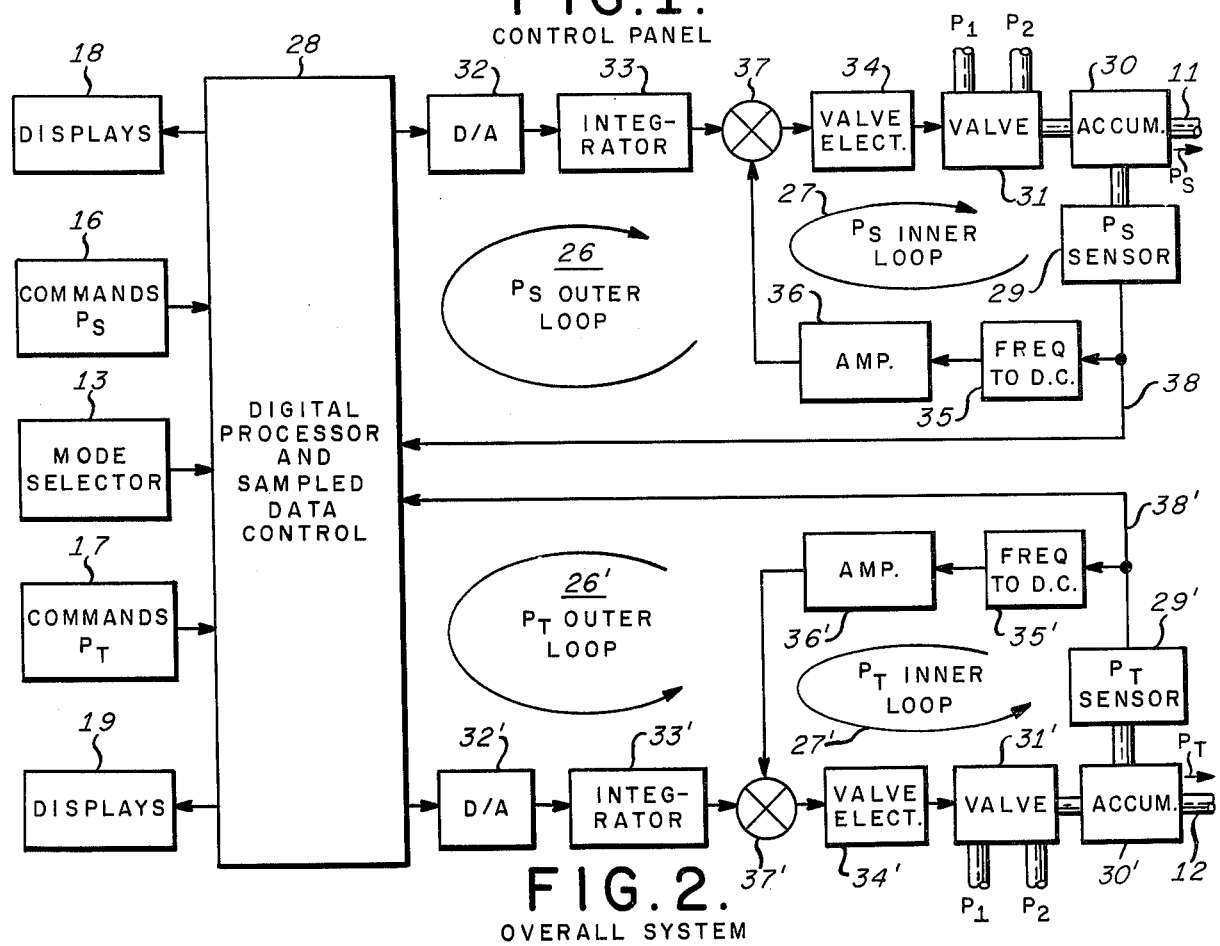
FIG. 2 is an over-all block diagram of the $P_S$ and $P_T$ channels generally illustrating the dual closed loop concept.

Referring now to FIG. 2, there is illustrated a general block diagram of the dual loop static ($P_S$) pressure control and the dual loop pitot ($P_T$) or total pressure control system of the present invention. The $P_S$ and $P_T$ channels are substantially identical and in general, only one of them will be discussed in detail in the following specification. As illustrated, each channel (for example, the static pressure ($P_S$) channel), comprises a primary precision, digitally controlled outer loop 26 and a secondary high response, high resolution analog controlled inner loop 27. The input command is set on thumb wheel counter 16, which may be a conventional binary coded decimal counter; i.e., each digit of the number being separately set and the total number set being represented by its corresponding binary coded number in the form of digital electric signals. This number is supplied to a conventional general purpose, real time, microelectronic digital processor and sampled data transfer apparatus 28. U.S. Pat. No. 3,573,442 to R. E. Andeen, assigned to the same assignee as the present invention, discloses an example of a sampled data transfer technique. Also, reference may be had to Chapter 3 of "Digital and Sampled Data Control Systems" by J. T. Tou, McGraw-Hill Book Company 1959, for detailed discussions of the techniques employed in the present invention.

The digital processor 28 is conventional and has been conventionally programmed to perform the sampled data switching functions, the mode logic functions, and the arithmetic functions required to convert the binary coded command input data, regardless of its units, into equivalent inches of mercury whereby all subsequent computations and controls are accomplished in common dimensional units. For example, assume that it is desired to provide the input command to the $P_S$ channel in terms of altitude in feet. The top button of buttons 13 of FIG. 1 is pressed and the command counter 16 is set in these units. The ALT FEET button 13 sets a processor subroutine such that the binary coded number corresponding to the set altitude in feet, when entered by enter button 23, is converted to a digital signal corresponding to the set altitude, but in units of inches of mercury. A similar conversion technique is used to convert all other command data into inches of mercury. Further, the same technique is used for converting sensed pressure in inches of mercury into the units originally commanded for display to the operator.

The digital number representing the commanded $P_S$ is compared with a digital number corresponding to the existing pressure that the system might be supplying to a UUT. This number is derived by means of a pressure sensor 29 of the vibrating diaphragm type such as that disclosed in Frische U.S. Pat. No. 3,456,508, assigned to the present assignee, the frequency output of which corresponds to the pressure in an accumulator or volume tank 30, this pressure in turn corresponding to the position of a conventional electrically controlled flapper-type control valve 31, the position of which determines the ratio between a high pressure source $P_1$ and a vacuum $P_2$. The accumulator pressure is the pressure supplied to the unit under test. The frequency output of the pressure sensor 29 is supplied through lead 38 to a frequency-to-count converter which may be part of the computer 28 in FIG. 2, and which converts such count to a digital number that is equal to the pressure in accumulator 30 in units of inches of mercury. This digital number is subtracted from the digital number representing the pressure command to produce a difference digital number corresponding to the error between the existing and commanded pressures. Also, the pressure sensor digital signal is supplied to the processor 28, where it is converted to the units of pressure of the original command and is then supplied to display 18 which indicates to the operator that the pressure being supplied to the UUT is that which had been commanded.

After further processing, to be described below, the digital error signal is applied to a conventional digital-to-analog converter 32, the output analog error signal being supplied to a main integrator 33 to be further described, to the pneumatic valve control electronic system 34 which, in turn, positions valve 31 so as to increase or decrease the resultant pressure within volume tank 30 and accordingly the pressure sensed by sensor 29 and its corresponding digital number, to reduce the digital error signal to zero and thereby reduce the input to integrator 33 to zero. Thus, the displayed pressure corresponds precisely to the commanded pressure, the pressure being supplied to the unit under test.

In order to improve the response time and resolution of the system and to provide high accuracy, large volumetric load driving capacity, smooth precision pressure rates, and to reduce any noise and possible granularity of the pneumatic pressure supplied to the unit under test, the analog inner loop 27 is provided. This loop includes, in addition to the common valve electronic system 34, valve 31, accumulator 30 and pressure sensor 29, a separate frequency-to-d.c. voltage converter 35 which may be of the type disclosed in Applicant's assignee's U.S. Pat. No. 3,784,845 to G. C. Haas. This converter converts the pressure sensor frequency to a d.c. voltage which is suitably increased in gain by amplifier 36 and is fed back to be compared, as by summing circuit 37, with the integrator 33 output signal from the digital loop 26. The loop 27 is, as stated, fast and of almost infinite resolution. As characteristic of analog electronic circuits, drifts and offsets may occur with time and temperature and this disadvantage is completely removed or compensated by the precision digital outer loop 26.

Figure 3:
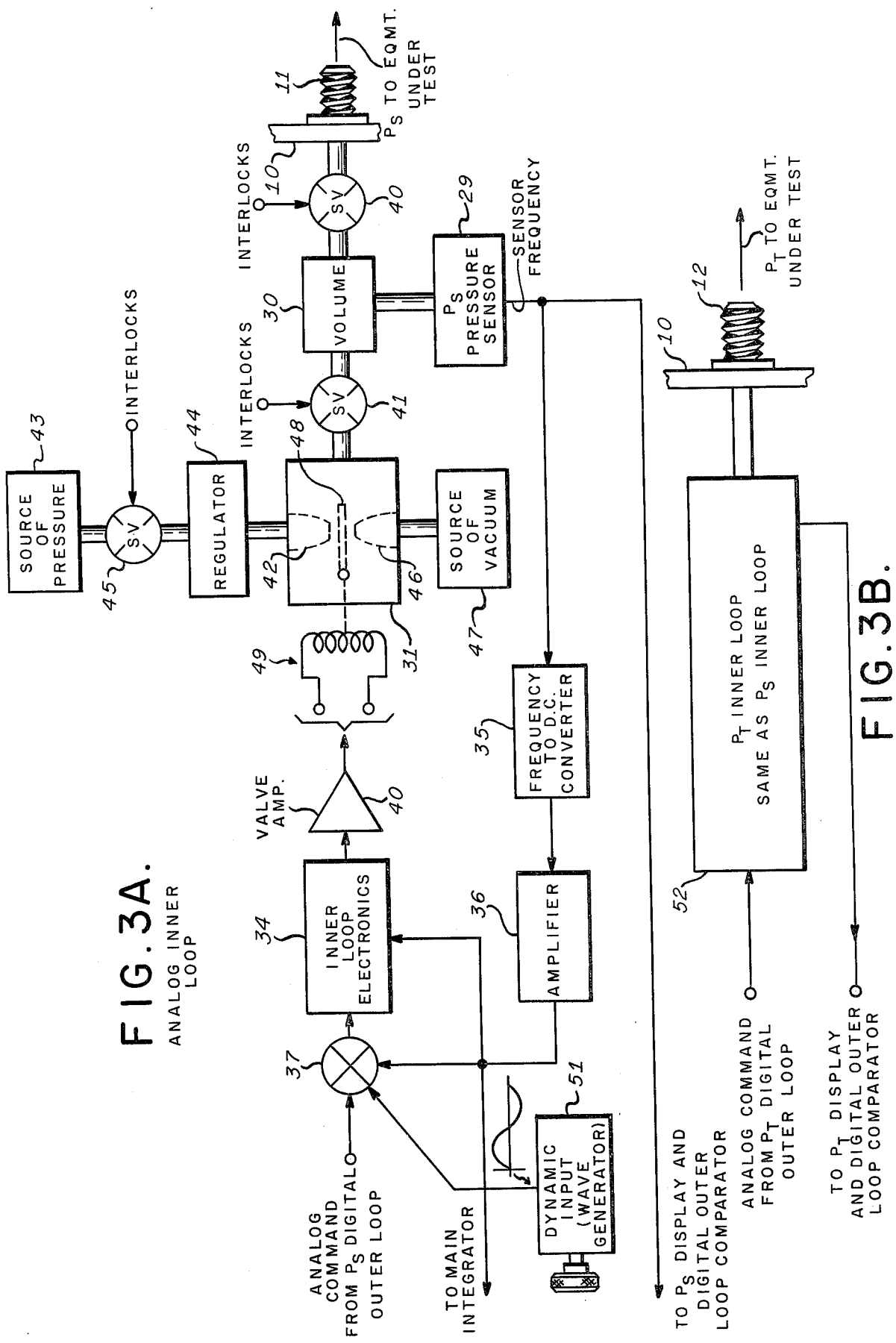
FIGS. 3A and 3B are block diagrams of the $P_S$ and $P_T$ analog inner closed-loops of each channel.

In FIG. 3A a block diagram of the analog inner closed servo loop 27 is disclosed in more detail. The $P_S$ pneumatic port 11 on front panel 10 connects to the static port of the unit under test. Port 11 is connected by a suitable pneumatic line to $P_S$ volume tank/or accumulator 30 through a conventional solenoid valve 40. This valve is part of the safety interlock control built into the system for protecting not only the system pneumatic elements (particularly the sensor 29), but also the unit under test. For example, when switching from one mode of operation to another, such as from a measure mode to a control mode, the valve 40 may be momentarily closed to protect the pressure sensor 29 and the UUT from any transient pressure surges. Accumulator 30 is connected to the control valve 31 through a further solenoid valve 41 which is used to isolate the control valve during the measure mode (button $M_S$ on the control panel of FIG. 1). This mode is used simply to provide a measure and display of the pressure in an external equipment or a UUT via the pressure sensor 29.

Control valve 31 comprises a generally conventional flapper-type of valve having one port 42 connected to a source of positive pressure 43 through a pressure regulator 44 and solenoid valve 45 (the latter being used as part of the mode control for preventing undesired loading of the vacuum system during the measure mode) and the other port 46 connected to a vacuum reference source 47 so that the control valve 31 can provide pressures to the accumulator 30 both above and below one atmosphere. The flapper 48 of the valve is the armature of a permanent magnet and electrical control coil arrangement 49 which positions the flapper between the pressure and vacuum ports in accordance with the current in the control coil, thereby to generate with the accumulator 30 a pressure proportional to control coil current. The analog inner loop 27 and control valve generate the commanded pressure in a very smooth analog fashion so that the controlled output pressure and pressure rate are stable and noise free.

The pressure within the accumulator 30 and hence within the UUT is sensed by the pressure transducer or sensor 29, which, as stated above, may be of the vibrating diaphragm type described in the Frische patent and which provides a signal output having a frequency dependent upon pressure. The output signal frequency of transducer 29 is supplied to the frequency-to-d.c. converter 35, the resultant d.c. signal output of which is raised to a desired level by amplifier 36 and applied to the inner loop or valve control electronic system 34 through one input of summing circuit 37, the other input of which is connected to receive the analog output of integrator 33 responsive to the digital pressure command from the digital outer loop 26. The electronic system 34 includes conventional variable gain circuits and a valve drive current amplifier 40 for precisely positioning the flapper valve 31. It will be noted that the d.c. signal from the converter 35 is also applied directly to the variable gain section of inner loop electronic system 34. This connection serves as an adaptive gain control for the inner loop, the purpose of which is to compensate for an inherent frequency vs. pressure nonlinearity of the vibrating diaphragm pressure sensor 29 as described in the Frische patent, the latter adaptive gain control being further discussed in the above-referenced Klem et al patent.

A special feature of the inner control loop 27 is the provision of means for superimposing a predetermined pressure variation about the commanded pressure. Such imposed variation may be used for a number of test purposes, for example, to test an aircraft air data computer and/or its installation effects in an aircraft (by connecting the system pressure ports 10, 11 to the aircraft pitot and static ports) for the effects of an in-flight phugoid oscillation. This predetermined variation may be provided by a dynamic pressure input device 51 which may comprise an audio frequency oscillator providing a sine wave output directly to summing junction 37, the amplitude and frequency thereof being adjustable by suitable adjusting knobs.

The $P_T$ inner control loop, shown in FIG. 3B simply by a block 52, is identical to the $P_S$ inner loop and supplies $P_T$ pressure to the UUT via the pneumatic port 12 in panel 10.

Figure 4:
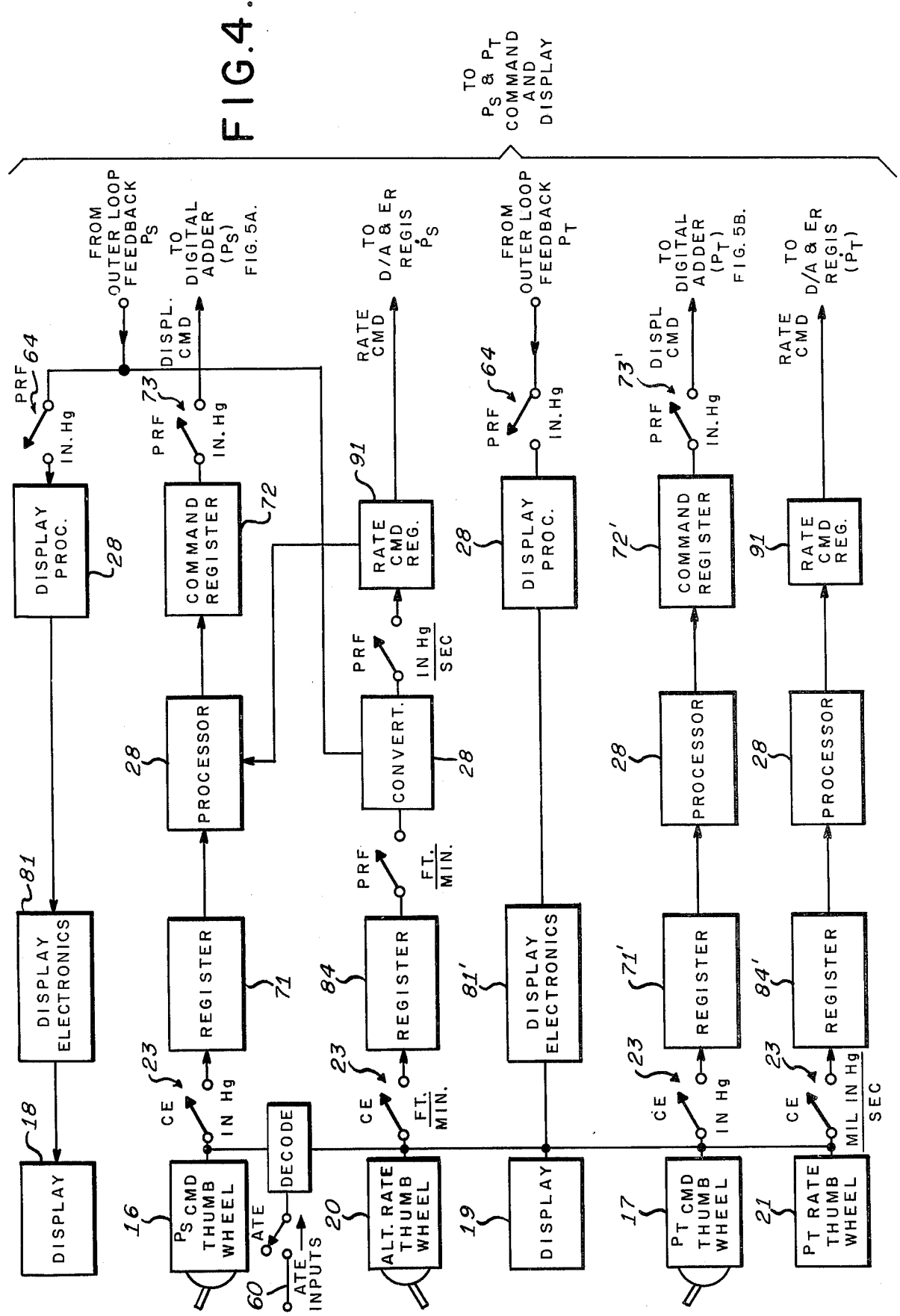

FIGS. 4, 5A, and 5B illustrate in more detail the static and pitot digital outer loops disclosed generally in FIG. 2. FIG. 4 illustrates in block diagram format the apparatus for generating the digital number corresponding to the static and/or pitot pressure and pressure rates commanded by the thumb wheels 16 and 17 and 20 and 21, respectively, of FIG. 1 and the display thereof at windows 18 and 19 when achieved by the control system. FIGS. 5A and 5B illustrate in block diagram format the generation of the digital error signals, digital-to-analog conversions, and outer loop control functions and compensations. FIG. 5B simply graphically illustrates that the pitot $P_T$ channel is the same as the static $P_S$ channel of FIG. 5A.

All pressure unit conversion computations, digital error signal generations, digital integrations, digital-to-display conversions, digital-to-analog conversions, sample and hold multiplexing, and the like functions of the digital outer loop 26 of the present invention are carried out using sampled data signal transfer or transport techniques all under control of digital processor 28. As will be explained below, the use of sampled data techniques is particularly beneficial in precisely achieving commanded pressures with little or no overshoot. The processor 28 is schematically illustrated in FIG. 6 and is a conventional general purpose, real time device which receives digitally formatted inputs such as binary coded decimal numbers from the command switches, performs all units conversions, arithmetic and integration operations, sampled data switching, and multiplexing controls, and transmits its results to digital-to-analog converter 32. Its entire operational program is performed once during each sampling period (a period corresponding to the system pulse repetition rate and hereinafter referred to as PRF) and, for speed of operation, it uses parallel bit arithmetic and two banks of scratch pad memory.

As shown in FIG. 6, the processor comprises basically a main memory 87, an arithmetic unit 88, a pair of scratch pad memories 89 and 90, a processor control unit 91, and a timing control 86. The timing control 86 provides all of the timing signals for the system. It comprises a basic oscillator operating at a high frequency (for example, 37.5 MHz) and a series of step down counters to provide the processor program strobe, two real time clock pulse trains for sampled data (PRF) timing (244 msec: 122 msec for the $P_S$ channel and 122 msec for the $P_T$ channel) and master reset timing pulses. The memory 87 contains the operational program and all units conversion constants tables, as will be described below. The operational program consists of an executive routine including conventional program language such as "input", "output", "add", "subtract", "multiply", etc., and other instructions such as "jump" which the programmer may use to call up subroutines for performing the required control functions including the units conversion equation solutions. The conversion constant tables may be stored in suitable sections of read-only memories in main memory 87. Each of the scratch pad memories 89, 90 provides temporary storage during computations and is addressed through a suitable "X" or transfer register. The control unit 91, under control of timing unit 86, consists of timing chains that generate addresses, control data transfer between the scratch pads and arithmetic unit, and multiplexes the operation of the A/D input data and D/A output data. As stated, all conversions, digital integration, process timing sequences, and computations are performed by the processor once each PRF so that fully cmputed data is transferred to the system digital-to-analog converter 32 during each sampling period.

As indicated above, there is a number of unit conversions required by the system; examples of typical conversions are described below:

Altitude (H) in feet to static pressure ($P_S$) in inches of mercury; i.e., $H = f(P_S)$;
Airspeed ($V_C$) in knots to differential pressure ($Q_C$) in inches of mercury; i.e., $V_C = f(Q_C)$;
$P_T = P_S + Q_C$;
Altitude rate $$\left(\frac{dH}{dt}\right)$$

in feet per minute to static pressure rate $$\left(\frac{dP_S}{dt}\right)$$

in inches of mercury per second;
Airspeed rate $$\left(\frac{dV_C}{dt}\right)$$

in knots per minute to differential pressure rate $$\left(\frac{dQ_C}{dt}\right)$$

in inches of mercury per second;
Static pressure sensor count to static pressure ($P_S$) in inches of mercury;
Total pressure sensor count to dynamic pressure ($P_T$) in inches of mercury;
Static pressure ($P_S$) in inches of mercury to altitude (H) in fee (for display);
Differential pressure ($Q_C$) in inches of mercury to airspeed ($V_C$) in knots (for display).

Referring now to FIGS. 1 and 4, it will be assumed that it is desired to use control panel 10 to provide selection control, and display of pressures $P_S$ and $P_T$ in inches of mercury, the "panel" button in the bank of buttons 22 being activated. To select this function, the bottom one of buttons 13 of FIG. 1 is depressed and will illuminate. Assume also that prior to setting in a new $P_S$ command, the system had previously been set to, say, sea level on a standard day; i.e., 29.9210 inches of Hg as shown in FIG. 1. To command the new $P_S$, the thumb wheel switches 16 are set to the desired numerical value, for example, 8.8855 inches of Hg (corresponding to 30,000 ft. altitude), thereby generating an electrical binary coded decimal number corresponding thereto. Assume also that it is desired to achieve the new $P_S$ at a desired rate, say, at 6000 feet per minute as shown in FIG. 1. The rate thumb wheel switches 20 are so set and a corresponding electrical binary coded decimal number is produced.

At this point, it will be understood that input pressure commands may be automatically entered into the test apparatus of the present invention from automatic test equipment (ATE) through a suitable direct data entry connection 60 shown schematically in FIG. 4 and selected by so labelled button of button bank 22 of panel 10.

The command enter switch 23 is pressed which initiates the processor program strobe and the electrical binary decimal number corresponding to 8.8855 inches of Hg is temporarily stored in a final value register 71 which may, if desired, be a position in scratch pad memory 89 of the processor of FIG. 6. Since the command units are entered in inches of mercury, no conversion computation is necessary and the command data is ready for supply by the processor 28 to the $P_S$ command register 72. Since the operator has also commanded a rate at which the new $P_S$ is to be achieved, the rate command data, the derivation of which will be described below, is also applied to the processor 28 which determines the signal value controlling the value of the digital number supplied to command register 72 (which may be a position in scratch pad memory 90 of the processor of FIG. 6), the displacement command being used as a final displacement reference in a manner to be described below. Once each PRF, as indicated schematically by switch 73, the displacement command number in command register 72 is supplied to a conventional digital adder 74 (FIG. 5A), where it is compared with a digital number corresponding to the existing pressure in the accumulator 30 as sensed by the pressure sensor 29 (FIG. 3A). How this number is generated will be described below. The difference between these digital signals is the system error signal which is ultimately reduced to zero each PRF in the digital closed loop 26 of FIG. 2. This displacement error is applied to an error register 75 (FIG. 5A) which is sampled each PRF, to switch 76, and to the conventional digital-to-analog converter 77. Converter 77 is time shared or multiplexed each PRF by processor 28 control logic unit 91 between other signals, as will be described. The resulting analog error signal is applied each PRF via switch 78 to a conventional sample and hold circuit 79. Suitable latching, not shown, of the output of the D/A converter 77 may be necessary for large error signals to assure full charge of the sample and hold circuit 79. The analog error signal is applied to the input of a primary control integrator 80 which integrates the signal of the sample and hold circuit and accordingly drives the control valve coil 49 and valve 31 through the summing circuit 37 and valve amplifier 40 (FIG. 3A). In the present example, integrator 80 previously had a large output corresponding to the assumed sea level pressure initial conditions. Since the foregoing occurs each PRF, and since the time constant of the integrator is very long compared with the PRF, it therefore serves to filter the discrete "stair steps" of the sampled data signal transfer characteristic. This is important, since the analog inner loop 27 is very fast and would tend otherwise to cause discrete steps in the pressure output of the valve 31 and possibly into the UUT, although the accumulator 30 also provides some pneumatic filtering. The control valve flapper 48 is moved in a direction to decrease the pneumatic pressure in accumulator 30 at the commanded rate toward that set by the $P_S$ command, in this example, 8.8855 inches of mercury.

Pressure sensor 29 senses this decrease in pressure and its output frequency accordingly increases due to the reduced pressure load on its vibrating diaphragm. The frequency output of sensor 29 is converted to a digital number corresponding to the pressure in accumulator 30 and in units of inches of mercury, and at each PRF, as by switch 82, it is fed back to digital summer 74 in a sense to reduce the instantaneous error signal output thereof toward zero. This pressure sensor output digital number is also supplied each PRF, as schematically indicated by switch 64, through process control 28 to display electronic system 81 of the $P_S$ display 18. Thus, and for the moment not considering pressure rates, at each PRF the integrator 80 is stepped to a new value until the output of adder 74 goes to zero and the flapper 48 stops moving, at which time the accumulator 30 pressure corresponds precisely to the commanded pressure. Under this condition, the error input to integrator 80 is zero and the integrator output has a constant value, holding control valve flapper valve 48 in a precise position to maintain the commanded $P_S$ in the accumulator 30 and hence in the UUT. Should there be any drift or offset in the high response analog loop 27, the digital loop 26, through integrator 80, serves as the long term reference and effectively prevents such errors fom affecting the output pressure. The sensor 29 frequency is converted to a digital number in a frequency-to-digital count converter 85. The sensor frequency (nominally 1K at about 2 inches of mercury to 3K Hz at about 32 inches of mercury) is divided by a conventional counter circuit and used to gate a high frequency clock (37.5 MHz) into a conventional ripple counter, the contents of which, after the gate has been turned off, is a digital count measure of the period of oscillation of the sensor. This digital number is the independent variable of a sixth-order, six-segment polynominal, the coefficients of which are stored in computer memory 87 for use in converting the sensor period to $P_S$ into inches of mercury. The polynominal coefficients include the non-linear characteristic of the pressure sensor as disclosed in the Frische patent. A typical curve fitting conversion technique using polynominal coefficients will be described below. Each PRF, the digital number corresponding to the sensor $P_S$ value is supplied to the processor for comparing with the digital command number in adder 74 for reducing the system error to zero. Simultaneously, the digital number representing the actual $P_S$ is supplied to the indicator electronics 81, which may be a conventional ASCII coded converter which, in turn, steps indicator 18 to a number corresponding to the pressure being supplied to the UUT.

As mentioned above, it is desired in the present example to achieve the commanded $P_S$ in inches of mercury at the desired rate of 6000 feet per minute as set on the altitude rate thumb wheel 20. As stated above, $P_S$ channel rates are in feet per minute in all modes of operation. Since the binary coded decimal number set on thumb wheel 20 is in units of feet per minute, this number must be converted to units of inches of mercury per second so that it may be used with the displacement command. This conversion is performed by the processor 28, as will now be described. This conversion, like the sensor 29 conversion and all other of the above listed conversions, involves a curve fitting process and will involve both displacement curves and derivative curves. For example, a typical displacement curve is that expressing $P_S$ in inches of mercury in terms of altitude H in feet, i.e., $P_S = f(H)$, and has a range from sea level ($P_S$ = 29.921 inches of Hg) to, say, 90,000 feet ($P_S$ = 0.3121). Thus, given any value of $P_S$, H may be determined, or vice versa. Similarly, a derivative curve of the displacement curve may be conventionally drawn expressing $(dP_S/dt)$ in inches of mercury per second in terms of $(dH/dt)$ in feet per minute. The other conversion functions employed in the present invention may be expressed in the same manner. There are many conventional techniques for storing these curve characteristics in computer memory 87. For example, for each value of H or $(dH/dt)$, a corresponding value of $P_S$ or $(dP_S/dt)$ may be stored in the memory; obviously, for the desired resolution over a large altitude range, an extremely large memory capacity would be required. Also there is a number of mathematical curve fitting techniques which may be employed, such as the least squares techniques, orthogonal polynominals technique, etc. The technique embodied in the present embodiment of the invention is the factorial polynominal technique as described by C. R. Wylie, Jr. in "Advanced Engineering Mathematics", published by McGraw-Hill Book Company, New York 1960. To accommodate the wide pressure ranges involved in the present invention, each of the curves is divided into six segments, the values of each segment being expressed by a sixth order polynominal, the seven coefficients of which are predeterminable constants and are readily stored in memory. Thus, only 42 numbers for the present conversions need be stored.

The equation expressing pressure rate in inches of mercury $$\left(\frac{dP_S}{dt}\right)$$

in terms of attitude rate in feet per second $$\left(\frac{dH}{dt}\right)$$

is $$\frac{dP_S}{dt} = \left(\frac{dP_S}{dH}\right)_{P_S} \left(\frac{dH}{dt}\right) \quad (1)$$

where $$\left(\frac{dP_S}{dH}\right)_{P_S}$$

is the slope of the pressure versus altitude curve at a given static pressure point $P_S$. The processor provides this conversion as follows. Upon activation of command enter button 23, a flip flop is set which, together with logic set by altitude rate thumb wheel 20, indicates the presence of an altitude rate command in register 84 (in this case always in feet per second). As the timing control 86 strobes the processor program in memory 87, a unique program word is reached which addresses the state of the altitude rate command flip flop and, since altitude rate command data is present at register 84, subsequent program words address the rate data and inputs it into a location in scratch pad memory 89 or 90. The scratch pad now contains altitude rate command data $$\left(\frac{dH}{dt}\right)$$

in feet per minute. In accordance with the above equation (1), it is now necessary to determine the value of $$\left(\frac{dP_S}{dH}\right)_{P_S}.$$

The present value of $P_S$ is required and is available at the output of frequency-to-count converter 85 (since it is the function of the system to maintain $P_S$ actual and $P_S$ command equal). A further program instruction from memory 87 stores the value of $P_S$ in another scratch pad location. Further program instructions examine the value of $(dH/dt)$, identify the sector of the $(dH/dt)$ versus $(dP_S/dt)$ curve, call up from memory the values of the conversion polynominal coefficients for this sector, and store them in another scratch pad location. A series of program instructions then solves the polynominal in conventional fashion using arithmetic unit 88, the stored values of the polynominal coefficients, and $P_S$, the result being the value of $$\left(\frac{dP_S}{dt}\right)_{P_S}$$

for the existing value of $P_S$ which is stored in a further scratch pad location. Another conversion program instruction instructs the arithmetic unit 88 to multiply the value of $(dH/dt)$ in the scratch pad with the value of $$\left(\frac{dP_S}{dt}\right)_{P_S}$$

in the scratch pad to provide the desired value of altitude rate $(dP_S/dt)$ in inches of mercury, which is then output to the command rate register 91. Of course, command rate register 91 may be eliminated and the final value of $(dP_S/dt)$ may be extracted directly from scratch pad 90.

With the sampled data signal transfer technique used in the present invention, the altitude rate control is a stair-step function of the command rate and the pulse repetition frequency, the resulting control rate being dependent upon the instantaneous amplitude of the "risers" of the stair step, that is, the slope of the stair step curve. This feature is used advantageously to attain dead beat capture of the commanded $P_S$ displacement, as will now be described.

Returning now to FIG. 4, at each PRF, the rate command signal from the rate command register 91 is accessed by processor 28 and is used to increment the command register 72 by a step proportional to the commanded rate. Since this occurs at each PRF, the value of data in command register 72 may be represented by a stair step curve having a slope corresponding to the commanded rate and at the last existing PRF the data represents the instantaneous total value of the $P_S$ displacement command and, through the digital closed loop 27, the instantaneous value of the actual $P_S$ supplied to the UUT. Also, at each PRF, this instantaneous value is compared by the processor with the value of the desired $P_S$ stored in register 71. When the difference between these values (i.e., digital numbers) is equal to or less than the actual commanded rate as stored in register 91 (or the actual rate times a predetermined constant depending upon specific design considerations), a subroutine is initiated by processor 28 which progressively reduces the amplitude of the "stair step riser"; i.e., the amplitude of the commanded rate supplied to the command rate register 72, thus producing a smooth asymptotic approach to the originally commanded pressure value. The amount that the rate is reduced is a predetermined one such that the approach time constant is the same and independent of the amplitude of the commanded rate and pressure displacement. In the present embodiment, at each successive step, the amplitude of the commanded rate is reduced by a factor proportional to the $PRF^{th}$ root of one half, that is with a PRF of 224 msec, the 4.47th root of 0.5 or 0.85635. This progressively reduced value of rate command is applied to the command register 72 and thence to adder 74 each PRF and is compared with the sensor 29 output correspondingly gradually to reduce the pressure change in accumulator 30. When the actual pressure is within 50 microinches of mercury of the commanded pressure, the proportional rate reduction is terminated and the actual pressure value is controlled to that command, assisted by an error integrator yet to be described.

Each PRF, the pressure rate command in register 91 is supplied directly to the main integrator 80 via the PRF switch 92, multiplexed D/A converter 77, PRF switch 93, and a rate sample and hold circuit 94. This feed-forward rate term serves to anticipate the $P_S$ error command from $P_S$ command register 72 and adder 74 by initiating the integrator 80 function. This tends to reduce any system lag in achieving the displacement rate command. Since the rate command has a large dynamic range, a large capacity D/A converter 77 is required just to accommodate this dynamic range. A smaller capacity D/A may be employed by dividing the rate feed-forward term into coarse and fine bits and time sharing or multiplexing the D/A between them. This has been illustrated in FIG. 5A, wherein the fine feed-forward rate bits are applied to the digital integrator (to be described below) branch by connection 97 and through PRF switch 95 and digital integrator sample and hold circuit 96, since the digital integrator is not operative during dynamic pressure modes. Since the altitude rate-to-pressure rate conversion is recalculated each PRF, the altitude rate-to-pressure rate non-linearity is continuously taken into account.

The foregoing has described what may be termed a displacement rate mode, that is a mode wherein it is desired simply to achieve a desired pressure displacement $P_S$ at a desired settable rate without particular concern with rate accuracy. However, it is often necessary to test the rate characteristics of penumatic apparatus with great accuracy, for example the rate of climb or dive characteristics of an aircraft air data computer or display instrument. For this purpose, the test equipment of the present invention provides a precision rate mode of operation. This mode is activated by the precision rate buttons 14 for the $P_S$ channel and 15 for the $P_T$ channel located on the control panel of FIG. 1.

In the displacement rate mode described above, the output of adder 74 and hence the output of error register 75 does not in the dynamic state ever quite reach zero due to the sampled data servo loop characteristic velocity lag error associated with the system gain-phase characteristic. In order to eliminate this velocity lag and to provide the desired precision of the $P_S$ pressure rate, an analog integrator 98 is connected to receive the analog converted digital output of the error register 75 as sampled and held by element 79, the integrator 98 output being applied in an aiding sense directly to the input of main integrator 80. Thus, the velocity lag is measured by integrator 98 and added to the error signal to compensate for the lag, thus forcing the main integrator output and hence the $P_S$ pressure rate, through the high response, precision characteristic of the analog inner loop 27, to correspond precisely, for example within ±1% to the commanded rate. When precision rate is not desired, the integrator 98 is short circuited by a switch 99 responsive to panel switch 14. It will be noted that the precision rate integrator 98 is responsive to an analog signal, thereby eliminating any possible noise due to quantization digital noise.

Once the commanded $P_S$ has been achieved, that is, the error input to main integrator 80 is zero and its output is a voltage which maintains the valve flapper 48 at a position such that the pneumatic pressure in accumulator 30 is the commanded pressure, through the analog inner loop 27, it can be maintained only if there are no drifts or offsets in either of the digital or analog closed loop systems. Although in usual practice it is rarely, if ever, possible to achieve this ideal, the present invention includes a means for effectively compensating for these deleterious effects. This means comprises a digital integrator schematically illustrated at 100 in FIG. 5A, the integration being performed by arithmetic unit 88 under control of a conventional integrator subroutine of processor 28. This subroutine is also performed once every PRF, but only after the digital command from command register 72 has settled out on the commanded $P_S$; that is, after the flare to this pressure has been achieved as described above. This is accomplished as follows. After the "stair step riser" amplitude has been reduced to a low value (corresponding to about 50 micro inches of mercury), as determined by the value of the digital number in command register 72, a timer 101, controlled by the system clock 86 and control logic 91, is started and runs for a predetermined time, say 5 seconds, to allow the actual pressure to settle out at the commanded pressure, after which period the digital integration subroutine is initiated. Thus, the integrator 100 is not activated during any dynamic mode, thereby permitting the fine rate feed-forward signal to share the D/A converter 77, as described above. The integration subroutine, performed each PRF, is responsive to the output of the digital adder 74 and hence serves to integrate any steady state error in the value of the output of the frequency-to-count converter 85 of pressure sensor 29. It will also be noted that since the error integration occurs at the digital processor, such integration will automatically compensate for any drift and input offset voltages, not only of the main integrator 80 and analog inner loop 27, but also of the D/A converter 77 and all of the sample and hold circuits 79, 94, and 96. The digital integrator 100 will reduce the analog errors to less than 50 micro inches of Hg.

The integral term, that is, the output of integrator 100, is fed to the D/A converter 77 and into sample and hold circuit 96 which, in turn, adjusts the signal level of the output of integrator 80 and hence the pressure in accumulator 30, through analog inner loop 27, to correspond precisely with the commanded pressure. Since any system offsets and drifts tend to remain constant for any one period of use of the test apparatus, the integrator 100 is effectively clamped during any dynamic modes of operation for such a period of use, while at system turn on and during system warm up the integrator 100 is zeroed.

In the foregoing example, the pressure displacement command set on thumb wheel 16 was in terms of $P_S$ in inches of mercury so that no conversions were necessary for this displacement command. As indicated in FIG. 1, the displacement command may be entered in terms of altitude in feet or in millibars as selected by mode select switches 13. If the command is in altitude in feet, conversion to $P_S$ in inches of mercury is necessary. The conversion is accomplished by the processor 28 using the polynominal coefficient curve fitting technique described above in connection with the altitude rate to $P_S$ rate conversion, but based on a conventionally plotted graph of $P_S$ in inches of mercury versus H in feet. In the case of a command of $P_S$ in millibars, the conversion is a simple ratio solution using the conventional ratio (2.036 in Hg/68.85 $M_B$) and performed each PRF by a simple processor subroutine which accesses the digital command in $M_B$, stores it in scratch pad 89, obtains the ratio constants from memory 87, performs the required multiplication in arithmetic unit 88, and stores the results in scratch pad 90 for transfer to the final value register 71. Thus, as stated above, the selected pressure units are always converted to inches of mercury.

The pitot or total pressure ($P_T$) channel is schematically illustrated in FIG. 4 and FIG. 5B and is the same in structure and operation in all major respects as the static pressure ($P_S$) channel just described. This channel is designed to have exactly the same overall characteristics, i.e., band width and phase leg, velocity error, etc., as the $P_S$ channel for the reason that both channels will be interconnected so as to provide control of both transient and steady state $Q_C$ pressure or calibrated airspeed $V_C$, without the necessity or complexity of providing a differential pressure sensor.

Thus, the $P_T$ channel may be employed to test pneumatic avionic equipment normally responsive to pitot or total pressure and differential pressure, such as, for example, the corresponding section of air data computers, airspeed indicators, or the like. The total pressure modes of operation which may be selected by the operator by pressing the corresponding buttons 13 of the control panel of FIG. 1, are airspeed in knots, $Q_C$ in inches of mercury, $P_T$ in millibars, and $P_T$ in inches of mercury. As in the $P_S$ channel, displacement rates and precision rates of $P_T$ may be selected in three modes; also airspeed rate in knots per minute, $P_T$ or $Q_C$ in milli-inches of mercury, or $P_T$ in millibars per minute may be selected depending upon the displacement mode selected.

Referring again to FIGS. 4 and 5B, it will be seen that the $P_T$ channel is the same as the $P_S$ channel. Also, as will become evident below, it is important that both channels operate with the same time constants or response characteristics, since both channels are used in the generation of calibrated airspeed or $Q_C$ pressure.

Assume that the operator wishes to supply a dynamic pressure $P_T$ of, say, 30.000 inches of mercury to a unit to be tested from an initial $P_T$ pressure of, say, 40.500 inches of mercury as indicated in FIG. 1 and also that he wishes to approach this value of $P_T$ at a rate of 310.00 milli-inches of mercury per second. As before, he presses the lower mode select button 13 and sets in the desired $P_T$ value on thumb wheel 17. Since he has selected $P_T$ in inches of mercury, he will set the rate thumb wheel 21 to the desired rate in milli-inches of mercury per second. As shown schematically in FIG. 4, upon pressing the command enter button 23, the selected values of $P_T$ displacement and rate command signals will be processed in exactly the same manner as the $P_S$ and altitude rate command signals were processed as described above, to produce in the $P_T$ accumulator and hence in the UUT, the $P_T$ pressure value with the precision of the digital control loop 26' (FIG. 2) and with the smoothness or high resolution and high response of the analog value control loop 27'. However, it will be noted that, since the $P_T$ rate is in units of milli-inches of mercury per second, only a simple gain constant change is necessary and no polynominal conversion solutions are required of the processor 28 as was the case with the altitude rate conversion. The output of $P_T$ pressure sensor 29' is converted to a proportional d.c. voltage in converter 35' for the analog inner loop control, as above, and also is converted to a proportional digital count which, in turn, is converted by the processor FIG. 6 to a digital number corresponding to the actual $P_T$ in inches of mercury. Using a conventional binary coded decimal code, it is converted by display electronic system 81' to a numeric display of $P_T$ in inches of mercury on numeric display 19.

The command control and display of $P_T$ displacement in units of millibars and of $P_T$ rate in terms of millibars per second are provided in the same manner, it being understood that the conversion of millibars to inches of mercury and millibars per minute to inches of mercury per second involves known conversion constants and is accomplished by a simple gain factor multiplication routine by processor 28.

In some applications it may be required to test pneumatic apparatus in terms of $Q_C$ in inches of mercury and $Q_C$ rates in inches of mercury per second. It many cases in the past it was necessary to provide a $Q_C$ sensor, that is a differential sensor responsive to static pressure $P_S$ and to dynamic pressure $P_T$. In the present invention, the command, control, and display of $Q_C$ is accomplished by cross control between the $P_S$ channel and the $P_T$ channel, thereby eliminating the requirement for a separate $Q_C$ sensor. Actually, in the present system, the control characteristics of each of the channels, for example in terms of response, resolution, and control system bandwidth, are carefully matched so as to make such cross control feasible. This matching of system characteristics is facilitated by the time-shared digital processor and sampled data transfer technique.

In the description which follows, the generation of $Q_C$ and $Q_C$ rate will be generally described, and thereafter a further description will be provided in connection with the mode of operation of the pneumatic test system most used, especially in connection with the testing of avionic pneumatic equipment; viz., altitude H in feet, altitude rate H in feet per minute, airspeed $V_C$ in knots, and airspeed rate $V_C$ in knots per minute.

Basically, the control of $Q_C$ and particularly $Q_C$ rate is performed in terms of $P_T$ and $P_T$ rate; that is, the pressure in accumulator 30' (FIG. 2) is a $P_T$ pressure corresponding to $Q_C$ through the relation $P_T = P_S + Q_C$ in inches of mercury, while $P_T$ rate is the derivative thereof $(dP_T/dt) = (dP_S/dt) + (dQ_C/dt)$. Thus, $Q_C$ in inches of mercury may be set on thumb wheel 17 and $Q_C$ rate in milli-inches of mercury per second may be set on thumb wheel 21. These values, being commanded in units of inches of mercury, may be directly added to the $P_S$ signal from the output of command register 72 of the $P_S$ channel to provide the resultant value of $P_T$ (corresponding to $Q_C$) in inches of mercury, which is the pressure to which the pressure in accumulator 30' is slaved through the valve 31' and pressure sensor 29', inner loop control 27', and outer loop feedback, all as above described with respect to the $P_S$ channel. Similarly, since $Q_C$ rate is commanded in units of milli-inches of mercury per second, this rate command may be combined, using the proper scale factor, with $P_S$ rate in inches of mercury pad second from $P_S$ rate register 91 in the $P_S$ channel to provide $(dP_T/dt)$ in inches of mercury per second. It will be noted that the $Q_C$ rates may be provided as precision rates, as were the $P_S$ rates in the $P_S$ channel through the operation of an integrator in the $P_T$ channel of FIG. 5B corresponding to integrator 98 in the $P_S$ channel. It will also be noted that since the commanded $Q_C$ in inches of mercury from sensor 29' is to be displayed at read-out 19, and since a corresponding $P_T$ in inches of mercury is in accumulator 30', the displayed value of $P_S$ must be cross-fed from the $P_S$ channel and subtracted from $P_T$ to provide the value of $Q_C$ to be displayed. This is indicated in FIG. 7 by the connection "X" at the top and bottom right side of the figure.

Figure 7:
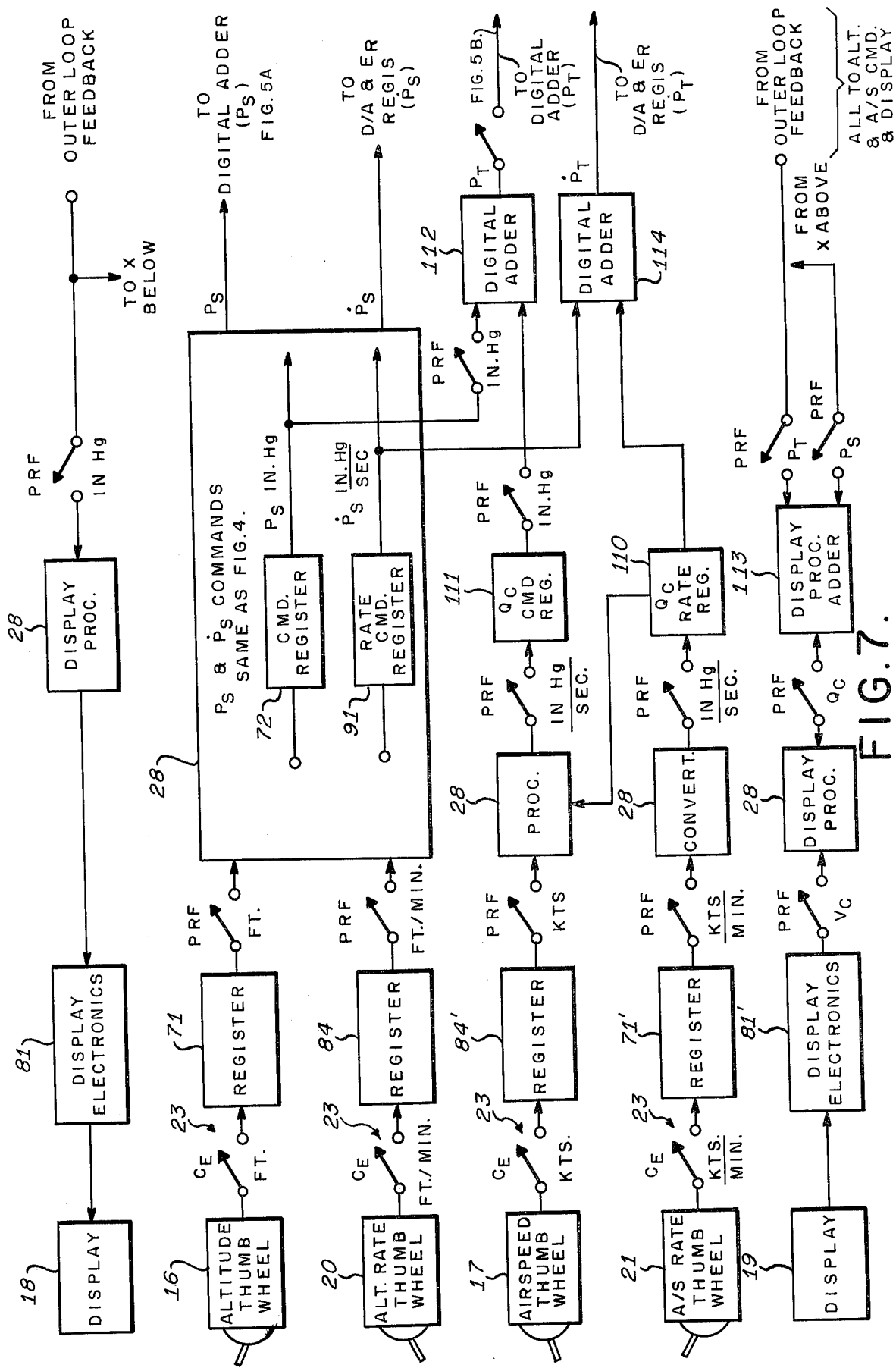
FIG. 7 is a block diagram similar to FIG. 4 illustrating the cross-coupling between the static and pitot channels for providing commands and displays of altitude in feet, altitude rate in feet per minute, airspeed in knots and airspeed rate in knots per minute.

Referring now to FIG. 7, there is schematically illustrated the pressure reference control system of the present invention configured in the altitude and airspeed mode. It will be noted that FIG. 7 couples with FIGS. 5A and 5B, there being no change in the latter in this mode. As shown in FIG. 1, the altitude-airspeed mode is selected by pressing the correspondingly labeled annunciator-switch of mode switch bank 13. This action activates through control logic unit 91, the processor of FIG. 6 prepares the processor so that it will execute the various programs and subroutines associated with this mode upon actuation of command enter button 23, as will be described below.

The operator sets the thumb wheel switches 16 to the desired altitude in feet. Upon pressing the command enter button 23, processor timing control 86 initiates during each PRF, a program which, through control logic unit 91, stores the switch binary coded decimal number in a position of scratch pad 89 (as above described with respect to the altitude rate conversion). As indicated above, the conversion of altitude in feet to $P_S$ in inches of mercury is accomplished using the same factorial polynomial curve fitting technique, the curve being $P_S = f(H)$ as described above, the coefficients of the six segment, sixth-order polynomial defining the curve being stored in memory 87. The processor program, through the command number in scratch pad 89, determines the curve sector involved and accesses the corresponding polynominal coefficients from memory 87 and places them in location in scratch pad 90. The scratch pads now contain the information required to solve the polynomial for the curve sector containing the commanded altitude. Further program instructions instruct the arithmetic unit 88 to solve the polynomial and store the result; i.e., a digital number corresponding to the commanded altitude in inches of mercury or $P_S$ in a location in scratch pad 90. This number becomes the $P_S$ command for command register 71 (FIG. 4) which is processed in the same manner as described above to produce the commanded $P_S$ in accumulator 30 and hence the UUT. Since the pressure in accumulator 30 and the UUT are to be displayed at read-out 18 in the same units as the command, the $P_S$ number from the $P_S$ sensor and frequency-to-count converter 85 must be reconverted from inches of mercury to altitude in feed. This is accomplished by (display) processor 28 in the same manner as described above.

The conversion of altitude rate in feet per minute to $P_S$ in inches of mercury per second has already been described, this rate command being stored in rate command register 91 of FIG. 4.

The calibrated airspeed pressure $V_C$ desired at the UUT is commanded by switch-annunciator 17 in terms of knots and the airspeed rate $\dot{V}_C$ is commanded by switch-annunciator 21 in terms of knots per minute. Both of these binary coded digital numbers from the thumb wheels require conversion, $V_C$ in knots to $Q_C$ in inches of mercury and $(dV_C/dt)$ in knots per minute to $(dQ_C/dt)$ in inches of mercury per second. Both of these conversions are accomplished each PRF by processor 28 (FIG. 6) in the same manner described above using the six-segment, sixth-order polynomial curve fitting technique. In FIG. 7, it will be understood that the $V_C$ to $Q_C$ and $\dot{V}_C$ to $\dot{Q}_C$ are accomplished by processor 28 and that the $Q_C$ rate term from $Q_C$ rate command register 110 is used to control the $Q_C$ processor to achieve the asymptotic approach of $Q_C$ to that commanded using the amplitude reduction of the $Q_C$ rate command by the factor of 0.85635 each PRF when $Q_C$ rate equals or approximately equals the $Q_C$ error. The resulting number in $Q_C$ command register 111 is thus the $Q_C$ reference for the commanded airspeed $V_C$.

As described above, the control of $Q_C$ and $Q_C$ rate is performed in terms of $P_T$ and $P_T$ rate; that is, the pressure in accumulator 30' (FIG. 2) is a $P_T$ pressure corresponding to $Q_C$ through the relationships $P_T = P_S + Q_C$ and $(dP_T/dt) = (dP_S/dt) + (dQ_C/dt)$, respectively. Thus, in FIG. 7 $P_S$ in inches of mercury is supplied each PRF from $P_S$ command register 72 to digital adder 112 to which is also supplied $Q_C$ from $Q_C$ command register 111. The sum of these signals is therefore the $P_T$ command which is supplied to the digital adder in FIG. 5B corresponding to digital adder 74 of FIG. 5A, where it is combined with the $P_T$ signal from $P_T$ pressure sensor 29' (FIG. 2) to generate the system error signal. The latter signal is processed in exactly the same manner as the $P_S$ error signal described above in connection with FIGS. 4 and 5A to produce the commanded pressure in accumulator 30' corresponding to the airspeed commanded on thumb wheel 17. Also, since the pressure in accumulator 30' is in terms of $P_T$ in inches of mercury and it is desired to display this pressure in terms of airspeed in knots, the value of $P_S$ sensed by sensor 29 in the $P_S$ channel is subtracted from the value of $P_T$ by sensed sensor 29' in digital adder 113, the difference being the value of $Q_C$. This value of $Q_C$ is in turn converted, using processor 28 (FIG. 6) and the conversion polynomial techniques described above, to a digitial number corresponding to $Q_C$ in terms of airspeed $V_C$ in knots for display at read-out 19 so that the display is in the same units of measure as that commanded by the thumb wheels 17.

In like manner, the $P_T$ rate command for the $P_T$ channel is provided by supplying the $P_S$ rate signal from rate command register 91 of FIG. 4 to digital adder 114 in the $P_T$ channel, which is also supplied the $Q_C$ rate signal from rate register 110, the sum representing the $P_T$ rate command which is processed in exactly the same manner as the $P_S$ rate command in the $P_S$ channel to provide $P_T$ rate control.

In the foregoing preferred embodiment of the present invention, the digitial processor of FIG. 6 is entirely conventional and may be readily programmed by a skilled programmer using conventional programming techniques as taught in a large number of texts on the subject, a typical example being "Computer Organization and Programming" by C. William Gear; McGraw-Hill Book Company, New York, 1969.

In the foregoing there has been disclosed a versatile dual loop test apparatus for selecting, controlling, and displaying pneumatic pressures for testing pneumatic systems, particularly pneumatic airborne avionic equipment. The pressures supplied by the test apparatus duplicate all pressure characteristics to which the equipment under test would experience in actual in-flight use.

However, while but a single embodiment of the invention has been disclosed, it will be understood that other embodiments may be constructed within the purview of the following claims.

I claim:

1. A controllable precision pneumatic pressure supply system for use in testing pneumatic apparatus comprising pneumatic means for supplying a controllable pneumatic pressure to the apparatus under test and including pressure responsive means for supplying a measure of said pressure, a precision digital closed loop control including means for providing a digital representation of a desired supply pressure, means for supplying a digital representation of the pressure supplied by said pressure responsive means, digital means for comparing said measures and providing a digital measure of the error therebetween, and means responsive to said digital error measure for providing an analog error signal proportional thereto, a high response, high resolution analog closed loop control including means responsive to said analog error signal, means for supplying an analog signal representative of the pressure supplied by said pressure responsive means, and summing means responsive to said analog signals for controlling said pneumatic means in a manner to reduce any difference between said analog error signal and said pressure responsive means analog signal to zero, whereby the pressure supplied to said apparatus under test corresponds to the digital representation of said desired pressure.

2. The pressure supply system as set forth in claim 1 wherein the means for providing a digital representation of a desired supply pressure comprises a pressure selector means including means for indicating the pressure selected and said system further including indicator means responsive to the digital representation of the pressure supplied by said pressure responsive means for supplying an indication of the selected pressure when said analog signals are reduced to zero.

3. The pressure supply system as set forth in claim 1 wherein said pneumatic means comprises a source of high pneumatic pressure,
a source of low pneumatic pressure,
a pneumatic accumulator coupled with said apparatus under test, and
a valve means coupled with said sources and said accumulator and responsive to said analog signal responsive means for producing within said accumulator a resultant pneumatic pressure proportional to a ratio of said high and low pressures dependent upon the operation of said valve means, said pressure responsive means being responsive to the pneumatic pressure in said accumulator.

4. The pressure supply system as set forth in claim 3 wherein said valve means is a positionable valve means, the position of which determines said ratio of high and low pressures, and wherein said means responsive to said analog error signal includes an integrator means for maintaining the position of said valve means when said analog error signal is reduced to zero.

5. The pressure supply system as set forth in claim 3 wherein said pressure responsive means comprises a pressure sensor for supplying an electrical signal having a frequency proportional to the pressure in said accumulator and wherein the means for supplying said digital representation thereof comprises a frequency-to-digital count converter responsive to a first output of said pressure sensor and wherein the means for supplying said analog signal representative of said pressure comprises a frequency-to-d.c. converter responsive to a second output of said pressure sensor.

6. The pressure supply system as set forth in claim 5 wherein said indicator means is responsive to said frequency-to-count converter.

7. The pressure supply system as set forth in claim 1 further including adjustable means coupled with said summing means for independently varying said supplied pressure in a predetermined manner relative to said desired pressure.

8. The pressure supply system as set forth in claim 7 wherein said predetermined pressure variation is a sinusoidal variation and said adjustable means includes means for varying the amplitude and frequency of said sinusoidal variation.

9. The pressure supply system as set forth in claim 1 wherein said means for supplying a digital representation of a desired supply pressure comprises first adjustable means for providing a digital number corresponding to a desired steady state supply pressure,
second adjustable means for providing a digital number corresponding to a desired rate at which said steady state supply pressure is to be achieved,
a digital-to-analog converter means,
a sampled date transmission control having a predetermined sampling period for periodically sampling and supplying said digital rate number to said digital-to-analog converter means and for providing an analog rate control signal which varies at a rate determined by the magnitude of said rate digitial number and the repetition period of said sampled data control.

10. The pressure supply system as set forth in claim 9 further including digital processing means responsive to said digital numbers representing said desired steady state supply pressure and said desired rate for reducing said desired rate number by a predetermined factor each sampling period whereby said desired steady state supply pressure is achieved in an asymptotic manner.

11. The pressure supply system as set forth in claim 9 further including analog integrator means having its output connected to said summing means, and
sample and hold circuit means responsive to the output of said digital-to-analog converter means and connected to supply outputs to said integrator means.

12. The pressure supply apparatus as set forth in claim 11 further including digital integrator means responsive to said digital error measure, and
means for supplying the output of said digital integrator to said digitial-to-analog converter means,
whereby to compensate for any offset errors in said analog control loop and said converter and sample and hold means.

13. A controllable precision pneumatic pressure supply system for use in testing pneumatic avionic apparatus of the type normally responsive to pitot static, pitot dynamic and/or total pitot pressures comprising first and second substantially identical pressure supply channels for supplying controllable pitot static reference pressure and pitot dynamic reference pressure respectively to said apparatus under test, each channel comprising pneumatic means for supplying said reference pressure to the apparatus under test and including pressure responsive means for supplying a measure of said pressure, a precision digital closed loop control including means for providing a digital representation of the pressure supplied by said pressure responsive means, digital means for comparing said measures and providing a digital measure of the error therebetween, and means responsive to said digital error measure for providing an analog error signal proportional thereto, a high response, high resolution analog closed loop control including means responsive to said analog error signal, means for supplying an analog signal representative of pressure measure supplied by said pressure responsive means, and summing means responsive to said analog signals for controlling said pneumatic means in a manner to reduce any difference between said analog signals to zero, whereby the pressure supplied to said apparatus under test corresponds to the digital representation of said desired pressure, and means responsive to the digital representation of the desired supply pressure of said first channel for modifying the digital representation of the desired supply pressure of said second channel whereby the pressure supplied to said apparatus under test corresponds to total pitot pressure.

14. The pressure supply system as set forth in claim 13 further including first and second indicator means responsive to the respective digital representations of the pressures supplied by said pneumatic means for indicating the pressures supplied to said apparatus under test and means responsive to digital representation of pressure supplied by said first channel for modifying the indicator means of said second channel whereby to provide an indication of the total pressure supplied to the apparatus under test.

15. The pressure supply system as set forth in claim 13 wherein said means for supplying said digital representation of a desired pressure of said second channel includes selector means for selecting a desired pitot total pressure and said means for modifying this desired pitot total pressure comprises digital summing means for supplying an output digital representation of a pressure corresponding to the sum of said digital representations of pitot static pressure and pitot total pressure.

16. A controllable precision pneumatic pressure supply system for use in testing pneumatic apparatus comprising pneumatic means for supplying a controllable pneumatic pressure to the apparatus under test and including pressure responsive means for supplying a measure of said pressure, a precision digital closed loop control including selector means for providing a digital representation of a desired supply pressure in any of a plurality of pneumatic pressure units, means for supplying a digital representation of the pressure supplied by said pressure responsive means in but one of said plurality of pressure units, digital means for converting said desired pressure unit to said one pressure unit, comparing said common unit measures and providing a digital means of the error therebetween, and means responsive to said digital error measure for providing an analog error signal proportional thereto, a high response, high resolution analog closed loop including means responsive to said analog error signal, means for supplying an analog signal representative of pressure measure supplied by said pressure responsive means, and summing means responsive to said analog signals for controlling said pneumatic means in a manner to reduce any difference between said analog signals to zero, whereby the pressure supplied to said apparatus under test corresponds to the digital representation of said desired pressure in said common pressure unit, pressure indicator means, digital means responsive to the digital representation of the pressure supplied by said pressure responsive means for converting said common pressure units to the units of said selected supply pressure, and means responsive to said last converter means for controlling said indicator means, whereby the pressure units indicated by said indicator means corresponds to the selected pressure units.

* * * * *